United States Patent
Noda

(10) Patent No.: US 12,203,628 B2
(45) Date of Patent: Jan. 21, 2025

(54) LUMINOUS EMBLEM

(71) Applicant: TOYODA GOSEI CO., LTD., Kiyosu (JP)

(72) Inventor: Yoshihide Noda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/421,085

(22) Filed: Jan. 24, 2024

(65) Prior Publication Data

US 2024/0263758 A1 Aug. 8, 2024

(30) Foreign Application Priority Data

Feb. 6, 2023 (JP) ................. 2023-015989

(51) Int. Cl.
*F21S 43/31* (2018.01)
*F21S 43/20* (2018.01)
*F21S 43/14* (2018.01)

(52) U.S. Cl.
CPC ............ *F21S 43/31* (2018.01); *F21S 43/26* (2018.01); *F21S 43/14* (2018.01)

(58) Field of Classification Search
CPC .. F21S 43/31; F21S 43/26; F21S 43/14; F21S 43/26241; F21S 43/265; F21S 43/28131; F21V 7/06; F21V 7/09; F21W 2104/00; B60R 13/005
See application file for complete search history.

(56) References Cited

U.S. PATENT DOCUMENTS

| | | | |
|---|---|---|---|
| 9,656,598 B1* | 5/2017 | Salter | G02B 6/002 |
| 2014/0029281 A1* | 1/2014 | Suckling | F21V 13/14 |
| | | | 362/510 |
| 2015/0260365 A1* | 9/2015 | Kitayama | F21S 43/26 |
| | | | 362/519 |
| 2016/0091174 A1* | 3/2016 | Hiki | F21S 43/14 |
| | | | 362/296.05 |
| 2017/0043709 A1* | 2/2017 | Dellock | F21S 43/19 |
| 2017/0253194 A1* | 9/2017 | Salter | B60Q 1/2661 |
| 2017/0355302 A1* | 12/2017 | Kuramitsu | G02B 6/002 |
| 2017/0357044 A1* | 12/2017 | Kuramitsu | G02B 6/005 |

(Continued)

FOREIGN PATENT DOCUMENTS

| | | |
|---|---|---|
| JP | 2014-141197 A | 8/2014 |
| JP | 2022-091007 A | 6/2022 |

*Primary Examiner* — Zheng Song
(74) *Attorney, Agent, or Firm* — Posz Law Group, PLC

(57) ABSTRACT

A luminous emblem includes a substrate including a mounting surface on which a light-emitting element is mounted, a housing that accommodates the substrate, an outer lens that guides light reflected by the housing, and an ornament portion that includes a transmissive portion. The ornament portion is mounted to the outer lens so as to cover the outer lens from outside. The housing includes a curved surface and a protrusion. The curved surface faces the transmissive portion and has a curvature. The protrusion reflects some of the light emitted from the light-emitting element toward the curved surface. A first position on the protrusion, which is a position farthest from the inner surface of the bottom wall, is located closer to the inner surface of the bottom wall than a second position on the curved surface, which is a position farthest from the inner surface of the bottom wall.

9 Claims, 1 Drawing Sheet

(56) References Cited

U.S. PATENT DOCUMENTS

| | | | | |
|---|---|---|---|---|
| 2018/0215086 A1* | 8/2018 | Geise | ................ | B29C 45/1671 |
| 2019/0217659 A1* | 7/2019 | Dellock | .................. | B60B 7/08 |
| 2021/0031854 A1* | 2/2021 | Carroll | ................ | F21S 43/195 |
| 2021/0095830 A1* | 4/2021 | Hansen | ................ | F21S 43/26 |
| 2021/0278056 A1* | 9/2021 | Gloss | .................... | F21S 43/14 |
| 2022/0308206 A1* | 9/2022 | Hirano | .................. | G01S 7/027 |

\* cited by examiner

LUMINOUS EMBLEM

BACKGROUND

1. Field

The present disclosure relates to a luminous emblem.

2. Description of Related Art

Japanese Laid-Open Patent Publication No. 2014-141197 discloses a luminous emblem. The luminous emblem includes an outer lens having an emblem attached to the surface, a housing, an LED as a light source, and an inner lens having a primary reflection surface and a secondary reflection surface. The LED and the inner lens are accommodated in a space defined by the outer lens and the housing. The reflection direction of the light emitted from the LED is controlled by the primary reflection surface and the secondary reflection surface of the inner lens in accordance with the emission angle, and the light is transmitted by the outer lens to cause the peripheral edge of the emblem to emit light.

In the luminous emblem described above, the light emission efficiency is improved by using the inner lens. Accordingly, luminous emblems such as those described above have the problem of being large in size because they need to have a sufficient space inside to accommodate the inner lens.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a luminous emblem includes a substrate, a housing, an outer lens, and an ornament portion. The substrate includes a mounting surface on which a light-emitting element configured to emit light is mounted. The housing reflects the light and has a bottom wall and a peripheral wall. One end of the housing has an opening. The housing accommodates the substrate in a state in which the mounting surface faces the bottom wall. The outer lens is provided on the housing to close the opening, the outer lens guiding the light reflected by the housing. The ornament portion includes a transmissive portion that transmits the light at least at an outer edge portion. The ornament portion is mounted to the outer lens to cover the outer lens from outside and performing a luminous display by using the light transmitted by the transmissive portion. The housing includes a curved surface and a protrusion. The curved surface is provided between an inner surface of the bottom wall and an inner surface of the peripheral wall, faces the transmissive portion, and has a curvature. The protrusion is provided on the inner surface of the bottom wall at a position facing the light-emitting element and reflects some of the light emitted from the light-emitting element toward the curved surface. A position on the protrusion that is farthest from the inner surface of the bottom wall is defined as a first position. A position on the curved surface that is farthest from the inner surface of the bottom wall is defined as a second position. The first position is located closer to the inner surface of the bottom wall than the second position is to the inner surface of the bottom wall.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A luminous emblem 11 according to one embodiment will be described with reference to the drawings.

Figure 1:
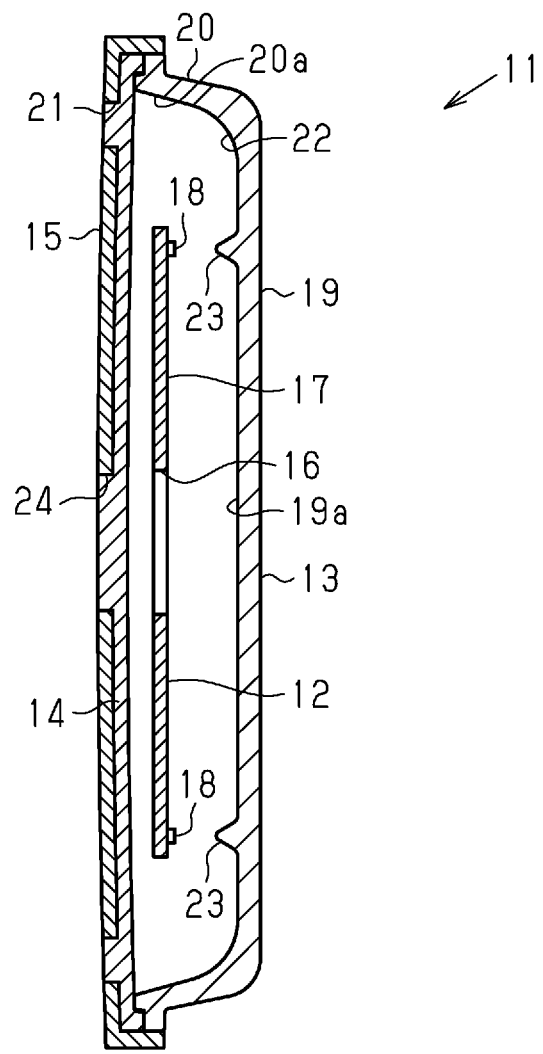
FIG. 1 is a cross-sectional view illustrating a luminous emblem according to an embodiment.

As shown in FIG. 1, the luminous emblem 11 is used by being mounted on, for example, a front grille of a vehicle. The luminous emblem 11 includes a substrate 12, a housing 13, an outer lens 14, and an ornament portion 15.

Substrate 12

As shown in FIG. 1, the substrate 12 is an insulating glass epoxy substrate or the like on which necessary circuit patterns are formed. The substrate 12 has a substantially circular shape having a through-hole 16 at a central portion thereof. The substrate 12 is fixed to the outer lens 14, the housing 13, and the like by fixing portions (not shown). At least a mounting surface 17 of the substrate 12 is made white to facilitate reflection of light. The light reflectance of the mounting surface 17 of the substrate 12 is preferably, for example, greater than or equal to 80%. The white color of the substrate 12 is preferably achieved by mass coloring, but may be achieved by using a resist or the like.

Multiple light-emitting elements 18 and circuits (not shown) necessary for controlling the light-emitting elements 18 are mounted on the mounting surface 17, which is one surface of the substrate 12. The light-emitting elements 18 include, for example, light emitting diodes (LEDs) that emit visible light. The light-emitting elements 18 are arranged at least at positions close to the outer edge of the mounting surface 17 at intervals in the circumferential direction.

Housing 13

Figure 2:
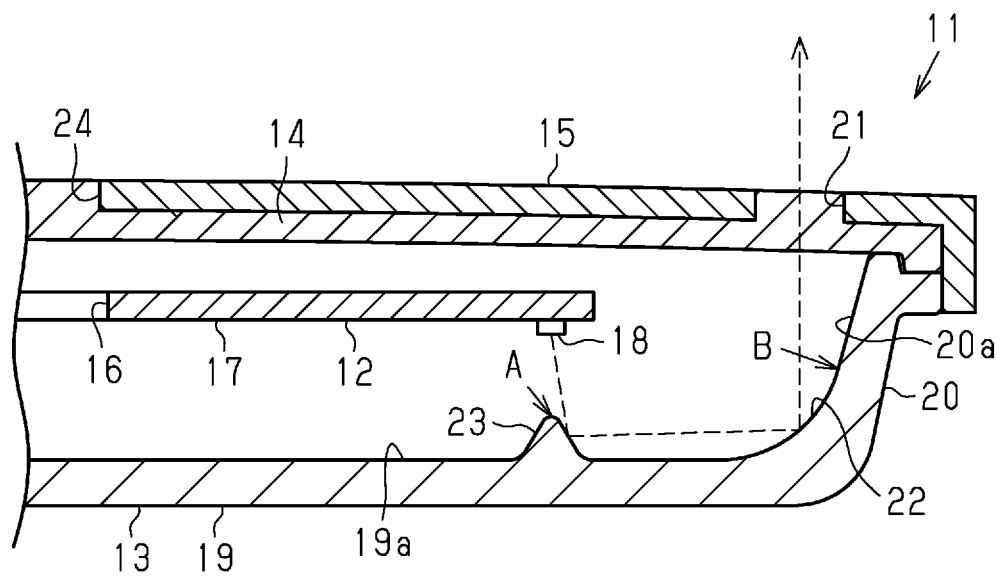
FIG. 2 is a partially enlarged view of FIG. 1.

As shown in FIGS. 1 and 2, the housing 13 has a shape of a box with a bottom wall 19 and a peripheral wall 20, and one end of the housing 13 has an opening. The housing 13 accommodates the substrate 12 in a state in which the mounting surface 17 faces the bottom wall 19. The housing 13 is made of, for example, a polycarbonate (PC) plastic, an acrylonitrile-butadiene-styrene (ABS) copolymer plastic, an acrylonitrile-ethylene-propylene-diene styrene (AES) plastic, an acrylonitrile-styrene-acrylate (ASA) copolymer plastic, or the like.

At least an inner surface of the housing 13 is made white to facilitate reflection of light. The light reflectance of the inner surface of the housing 13 is preferably, for example, greater than or equal to 80%. The white color of the housing 13 is preferably achieved by mass coloring, but may be achieved by painting or the like.

In the housing 13, an inner surface 19a of the bottom wall 19 and an inner surface 20a of the peripheral wall 20 are both formed by flat surfaces. A curved surface 22 is provided between the inner surface 19a of the bottom wall 19 and the inner surface 20a of the peripheral wall 20 in the housing 13. The curved surface 22 faces an outer edge transmissive portion 21, which will be discussed below, and has such a radius of curvature that it bulges outward. The curved surface 22 connects the inner surface 19a of the bottom wall 19 and the inner surface 20a of the peripheral wall 20 to each other. The radius of curvature of the curved surface 22 in the present embodiment is set in a range of 4 mm to 10 mm. A position on the curved surface 22 that is at the boundary with the inner surface 20a of the peripheral wall 20 is defined to as a second position B. The second position B is a position on the curved surface 22 that is farthest from the inner surface 19a of the bottom wall 19.

The housing 13 includes protrusions 23 on the inner surface 19a of the bottom wall 19 at positions corresponding to the light-emitting elements 18. The protrusions 23 protrude toward the light-emitting elements 18. Each protrusion 23 is configured to have, for example, a cone shape in order to reflect the light emitted from the corresponding light-emitting element 18 so as to diffuse the light to the surroundings. The protrusion 23 reflects some of the light emitted from the light-emitting element 18 toward the curved surface 22.

A distal end of the protrusion 23, that is, a position on the protrusion 23 farthest from the inner surface 19a of the bottom wall 19 is defined as a first position A. The first position A is located closer to the inner surface 19a of the bottom wall 19 than the second position B in the protruding direction of the protrusion 23 is to the inner surface 19a of the bottom wall 19.

Outer Lens 14

As shown in FIG. 1, the outer lens 14 is provided on the housing 13 to close the opening of the housing 13. The outer lens 14 is a transparent member that guides light reflected by the inner surface of the housing 13 to the ornament portion 15. The outer lens 14 is preferably made of, for example, an acrylic plastic such as polymethyl methacrylate or a transparent plastic such as a polycarbonate (PC) plastic. The outer lens 14 may contain a diffusing material such as a filler that diffuses light in order to increase the light diffusion properties.

Ornament Portion 15

As shown in FIG. 1, the ornament portion 15 is attached to the outer lens 14 to cover the entire outer lens 14 from the outside. The ornament portion 15 includes a central transmissive portion 24 formed by an opening formed at the center and an outer edge transmissive portion 21 as an example of a transmissive portion formed by an opening formed in the outer edge portion.

The outer lens 14 is partially exposed from the central transmissive portion 24 and the outer edge transmissive portion 21 in the ornament portion 15. The ornament portion 15 performs a luminous display by using light guided by the outer lens 14 and transmitted by the central transmissive portion 24 and the outer edge transmissive portion 21.

A region in the ornament portion 15 other than the central transmissive portion 24 and the outer edge transmissive portion 21 is a non-transmissive region, which does not transmit light. The ornament portion 15 is made of, for example, a polycarbonate (PC) plastic or an acrylonitrile-butadiene-styrene (ABS) copolymer plastic. For example, coating, plating, or the like having a light shielding property is applied to the non-transmissive region of the ornament portion 15.

Operation of Luminous Emblem 11

As shown in FIGS. 1 and 2, when the luminous emblem 11 is caused to emit light, first, light is emitted from each light-emitting element 18 mounted on the mounting surface 17 of the substrate 12 in the housing 13. Some of the light emitted from each of the light-emitting elements 18 is reflected one or more times between the inner surface 19a of the bottom wall 19 of the housing 13 and the mounting surface 17 of the substrate 12 and is guided by the outer lens 14 to cause the central transmissive portion 24 of the ornament portion 15 to emit light.

Another part of the light emitted from each light-emitting element 18 is reflected by the corresponding protrusion 23 and then reflected by the curved surface 22, as indicated by a broken line in FIG. 2. At this time, since the first position A on the protrusion 23 is located closer to the inner surface 19a of the bottom wall 19 than the second position B on the curved surface 22 is to the inner surface 19a of the bottom wall 19, a sufficient radius of curvature of the curved surface 22 is ensured. Particularly, the radius of curvature of the curved surface 22 of the present embodiment is set in a range of 4 mm to 10 mm. Thus, the light reflected by the curved surface 22 travels toward the outer edge transmissive portion 21 while being appropriately diffused, and thus the outer edge transmissive portion 21 properly emits light.

This configuration improves the light emission efficiency in the outer edge transmissive portion 21 without using an inner lens like the one disclosed in Japanese Laid-Open Patent Publication No. 2014-141197. Specifically, since it is not necessary to ensure a sufficient space for accommodating an inner lens in the housing 13, it is possible to achieve both downsizing of the luminous emblem 11 and improvement of light emission efficiency in the outer edge transmissive portion 21.

If the first position A on the protrusion 23 is not located closer to the inner surface 19a of the bottom wall 19 than the second position B on the curved surface 22 is to the inner surface 19a of the bottom wall 19, a sufficient radius of curvature of the curved surface 22 cannot be ensured. In this case, the light reflected by the curved surface 22 would be shifted toward the central transmissive portion 24 and would not travel toward the outer edge transmissive portion 21. As a result, the light guided to the outer edge transmissive portion 21 would become insufficient, and the light emission efficiency in the outer edge transmissive portion 21 would decrease.

Advantages of Embodiment

The above-described embodiment achieves the following advantages.

(1) The housing 13 of the luminous emblem 11 includes the curved surface 22 and the protrusions 23. The curved surface 22 is provided between the inner surface 19a of the bottom wall 19 and the inner surface 20a of the peripheral wall 20, faces the outer edge transmissive portion 21, and has a curvature. The protrusions 23 are provided on the inner surface 19a of the bottom wall 19 at positions facing the light-emitting elements 18 and reflect some of the light emitted from the light-emitting elements 18 toward the curved surface 22. The first position A, which is a position on each protrusion 23 which is farthest from the inner surface 19a of the bottom wall 19, is located closer to the inner surface 19a of the bottom wall 19 than the second position B on the curved surface 22, which is a position farthest from the inner surface 19a of the bottom wall 19, is to the inner surface 19a of the bottom wall 19.

With the above-described configuration, since the first position A on the protrusion 23 is located closer to the inner surface 19a of the bottom wall 19 than the second position B on the curved surface 22 is to the inner surface 19a of the bottom wall 19, a sufficient radius of curvature of the curved surface 22 is ensured. Accordingly, some of the light emitted from the light-emitting elements 18 is reflected by the protrusions 23 and then reflected by the curved surface 22 to travel toward the outer edge transmissive portion 21 while being diffused. This configuration improves the light emission efficiency in the outer edge transmissive portion 21 without using an inner lens like the one disclosed in Japanese Laid-Open Patent Publication No. 2014-141197. Specifically, since it is not necessary to ensure a sufficient space for accommodating an inner lens in the housing 13, it is possible to achieve both downsizing of the luminous emblem 11 and improvement of light emission efficiency in the outer edge transmissive portion 21.

(2) In the luminous emblem 11, the radius of curvature of the curved surface 22 is greater than or equal to 4 mm.

With this configuration, since the radius of curvature of the curved surface 22 is set to be greater than or equal to 4 mm, the light reflected by the curved surface 22 is allowed to be guided to the outer edge transmissive portion 21 while being diffused. This further improves the light emission efficiency in the outer edge transmissive portion 21.

(3) In the luminous emblem 11, the radius of curvature of the curved surface 22 is less than or equal to 10 mm.

With this configuration, since the radius of curvature of the curved surface 22 is set to be less than or equal to 10 mm, excessive diffusion of the light reflected by the curved surface 22 is suppressed. This maintains the light emission efficiency of the outer edge transmissive portion 21 in a favorable manner.

Modifications

The above-described embodiment may be modified as follows. The above-described embodiment and the following modifications can be combined as long as the combined modifications remain technically consistent with each other.

As long as the first position A on the protrusion 23 is located closer to the inner surface 19a of the bottom wall 19 than the second position B on the curved surface 22 is to the inner surface 19a of the bottom wall 19, the radius of curvature of the curved surface 22 may be less than 4 mm.

As long as the first position A on the protrusion 23 is located closer to the inner surface 19a of the bottom wall 19 than the second position B on the curved surface 22 is to the inner surface 19a of the bottom wall 19, the radius of curvature of the curved surface 22 may be greater than 10 mm.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A luminous emblem, comprising:
   a substrate including a mounting surface on which a light-emitting element configured to emit light is mounted;
   a housing that reflects the light and has a bottom wall and a peripheral wall, one end of the housing having an opening, and the housing accommodating the substrate in a state in which the mounting surface faces the bottom wall;
   an outer lens provided on the housing to close the opening, the outer lens guiding the light reflected by the housing; and
   an ornament portion that includes a transmissive portion that transmits the light at least at an outer edge portion, the ornament portion being mounted to the outer lens to cover the outer lens from outside and performing a luminous display by using the light transmitted by the transmissive portion, wherein
   the housing includes a curved surface and a protrusion,
   the curved surface is provided between an inner surface of the bottom wall and an inner surface of the peripheral wall, faces the transmissive portion, and has a curvature,
   the protrusion is provided on the inner surface of the bottom wall at a position facing the light-emitting element and reflects some of the light emitted from the light-emitting element toward the curved surface, the protrusion protruding toward the light-emitting element,
   a position on the protrusion that is farthest from the inner surface of the bottom wall is defined as a first position, the first position being located at a distal end of the protrusion,
   a position on the curved surface that is farthest from the inner surface of the bottom wall is defined as a second position, and
   the first position is located closer to the inner surface of the bottom wall than the second position is to the inner surface of the bottom wall.

2. The luminous emblem according to claim 1, wherein a radius of curvature of the curved surface is greater than or equal to 4 mm.

3. The luminous emblem according to claim 2, wherein the radius of curvature of the curved surface is less than or equal to 10 mm.

4. The luminous emblem according to claim 1, wherein the distal end of the protrusion faces the light-emitting element.

5. The luminous emblem according to claim 1, configured and adapted to be mounted on a vehicle.

6. The luminous emblem according to claim 1, comprising a plurality of light-emitting elements, including the light-emitting element, mounted on the mounting surface.

7. The luminous emblem according to claim 1, the light-emitting element being mounted adjacent to an outer edge of the mounting surface.

8. The luminous emblem according to claim 1, the transmissive portion further including a central transmissive portion that transmits the light at a center of the ornament portion.

9. The luminous emblem according to claim 1, a region in the ornament portion other than the transmissive portion being a non-transmissive region which does not transmit light.

* * * * *